United States Patent [19]

Metzger

[11] Patent Number: 4,530,349
[45] Date of Patent: Jul. 23, 1985

[54] THERAPY AID FOR TREATING CYSTIC FIBROSIS

[76] Inventor: Dorothy Metzger, 4412 Cathey Cir., Peoria, Ill. 61615

[21] Appl. No.: 558,621

[22] Filed: Dec. 6, 1983

[51] Int. Cl.³ ............................................ A61K 39/00
[52] U.S. Cl. .............................. 128/1 R; 128/132 R; 2/102; 434/262; 434/395
[58] Field of Search ................... 128/1 R, 116, 132 D, 128/303 B, 379, 384; 2/75, 80, 102; 434/262, 265, 275, 256, 257, 395–400; 272/98; 273/1 F

[56] References Cited

U.S. PATENT DOCUMENTS

| | | | |
|---|---|---|---|
| 2,617,412 | 11/1952 | Steinberger | 128/155 |
| 3,525,330 | 8/1970 | Greene | 2/102 |
| 4,100,620 | 6/1978 | Pecoraro | 2/102 |
| 4,170,986 | 10/1979 | Hinshaw et al. | 128/1 R |
| 4,253,197 | 3/1981 | Posta | 434/395 |

FOREIGN PATENT DOCUMENTS 47809 10/1978 U.S.S.R. .............................. 272/98

Primary Examiner—Karen Kaechele
Attorney, Agent, or Firm—Laff, Whitesel, Conte & Saret

[57] ABSTRACT

A vest, made from quilted material, has a plurality of individually numbered positions formed thereon to establish a prescription sequence of therapy steps to aid victims of cystic fibrosis. Graphic material may be associated with each position to identify a body posture for the patient.

10 Claims, 14 Drawing Figures

THERAPY AID FOR TREATING CYSTIC FIBROSIS

This invention relates to medical aid devices, and more particularly, to therapy aids for treating cystic fibrosis.

Cystic fibrosis is a disease which attacks the lungs and bronchial tubes. A characteristic of this disease is that some portion of the respiratory tract collects mucus or phlegm to a degree that breathing becomes impaired. Therefore, when a patient finds it difficult to breathe, it is necessary to undertake a physical therapy program to produce bronchial drainage by loosening and eliminating the mucus or phlegm.

The therapy program for bronchial drainage uses vibration plus a sequence of physical maneuvers of the patient's body to stimulate movement of secretions and to relieve respiratory airway obstructions due to accumulated mucus or phlegm. A careful positioning of the patient during a vibration treatment helps secretions to move under gravity from small airways into the bronchi and larger airways. There, the secretions can be either coughed up or swallowed.

The patient's body is positioned with a blocked lung segment which is to be drained placed uppermost and the associated bronchus is placed, as neatly as possible directly beneath the blocked segment to enable a gravity caused drainage flow. Both the positions to be used, and the frequency and duration of a vibration therapy treatment must be individually prescribed for a particular patient.

In addition to having the patient in a proper posture for each in a number of therapy steps, it is also necessary to clap or thump particular spots on the patient's body, for each therapy step. This constant pounding of the same spot leads to soreness and sometimes great pain. Therefore, clapping or thumping should not be done over bare skin, but over soft, comfortable padding, which may be loose clothing, towels, or the like and not over buttons or seams. The padding must be thin enough for the clapping or thumping to loosen the mucus or phlegm, and otherwise, as thick as possible.

Therefore, every patient, especially children, requires the constant care of another person who is well acquainted with that particular patient's individual health needs. For children, this means that a parent, for example, cannot ever be very far away from the child for fear that breathing may become difficult and no one will be around to give the required assistance. As a result, the parent becomes so enslaved to the need for being instantly available to give therapy that it is impossible to enjoy even a simple evening out. The resulting psychological stress upon the parent becomes extreme. Accordingly, aside from the treatment of the patient, a therapy aid should also enable the parent or other assistant therapist to enjoy sometime away from the patient, with a knowledge that a substitute therapist knows the individual requirements for treating a particular patient.

A number of other considerations also enter into the design of a therapy aid for the treatment of a cystic fibrosis patient. When performing bronchial drainage therapy on children, a major problem is the lack of cooperation and interest of the child. Therefore, it is desirable to provide some means which not only attracts the interest of infants and children, but which also helps the therapist give clear and easy-to-follow instructions to the patient. It should be possible to vary the therapy aid considering the age and personality of the patient and the imagination and patience of the therapist.

Accordingly, an object of this invention is to provide new and improved means for and methods of treating respiratory problems, and particularly, cystic fibrosis.

Another object is to provide means for enabling a therapy assistant to treat a previously unknown patient without requiring an undue amount of skill. Here, an object is to eliminate a need for the assistant to made a detailed study of the individual prescriptional needs of a particular patient before treating him.

Still, another object of the invention is to provide means for automatically padding the proper places on a patient's body with a correct amount of padding to prevent soreness while enabling a correct vibration of a treated body area.

Yet another object of the invention is to provide a therapy aid which may attract the attention of a child and cause him to contribute, to cooperate, and to facilitate his own treatment.

A preferred embodiment of the invention is shown in the attached drawing, wherein.

Figure 3:
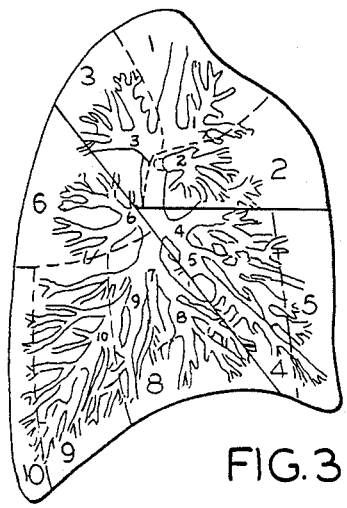
Figure 4:
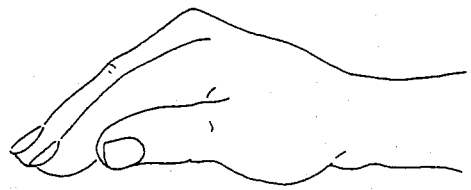

FIG. 3 schematically shows the broncho-pulmonary segments of a human lung;

FIG. 4 shows the proper cupped hand position for administering therapy; and

FIGS. 5-12 show successive therapy steps, illustrating different body positions for cystic fibrosis therapy.

Figure 1A:
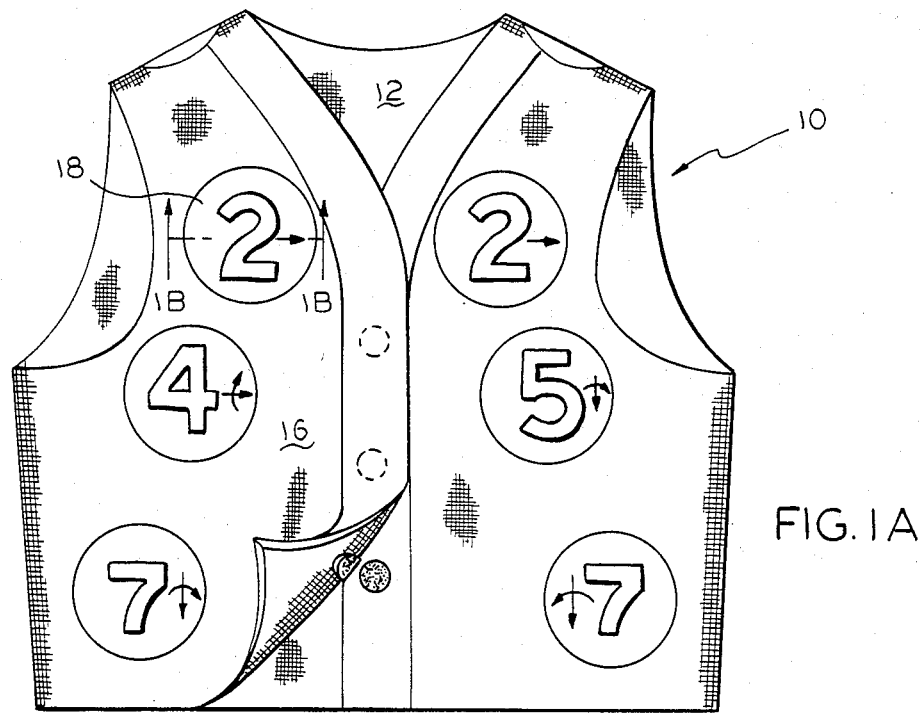
FIG. 1A shows the front of an inventive vest.
Figure 1B:
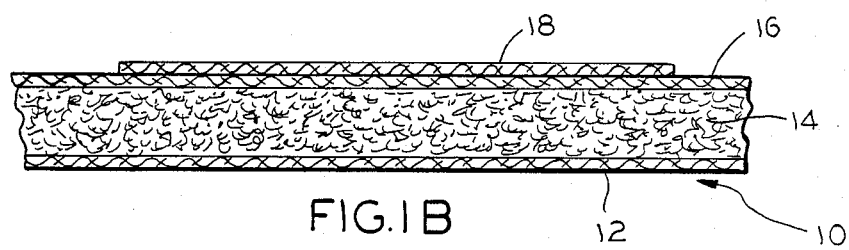
FIG. 1B is a cross section of the vest, taken along line 1B—1B of FIG. 1A.
Figure 2:
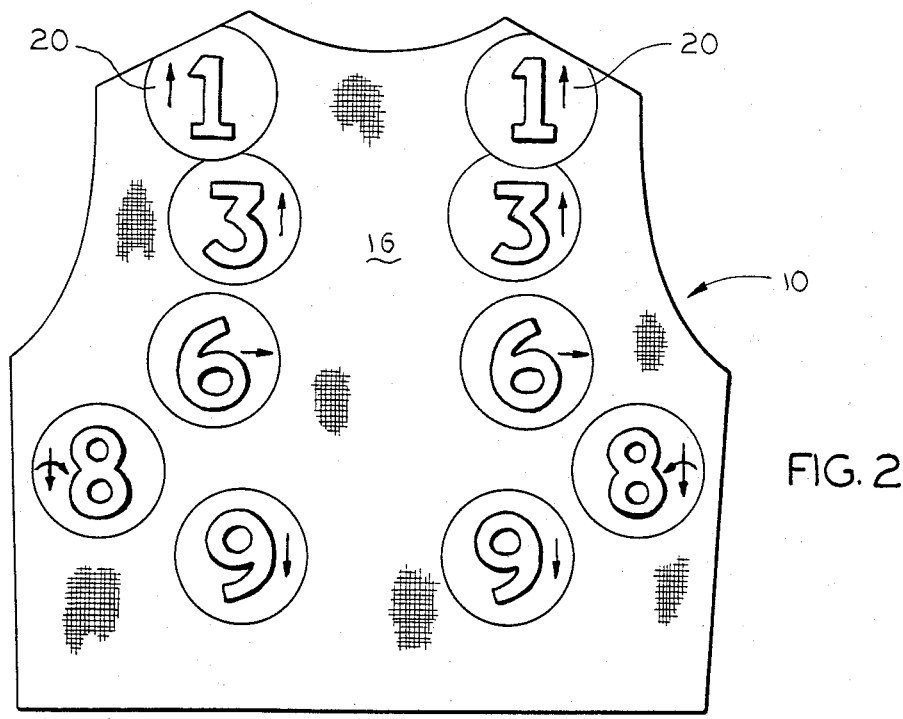
FIG. 2 shows the back of the vest of FIG. 2.

The therapy aid is shown in FIGS. 1, 2 as a vest 10 which the patient puts on. The front of the vest is closed by fasteners (such as "Velcro" hook and loop fasteners) which are free of hard lumps (such as buttons) that might hurt the patient, if he is pounded over the lump. The vest is preferably made of a quilted material (FIG. 1B) having a loose, single knit, preferably polyester, lower layer 12, unwoven batting 14, a woven upper layer 16, and a patch of material 18 having a relatively fine waffle weave. The batting provides a general amount of padding and each patch adds in incremental amount of padding for a particular spot.

Sewn on the vest are a plurality of sequentially numbered patches, such as shown at 18 (FIG. 1). The numbered patches correspond to the successive therapy steps which are followed to treat the cystic fibrosis patient. Thus, the therapy begins by thumping or clapping the patient over patch "1", then patch "2", etc. These patches are sewn or otherwise formed on the vest at prescription locations for a particular individual patient's needs. Thus, for example, if one patient has an upper lobe disease, another patient has a lower lobe disease, and a third has malformed lungs, the locations of the numbered patches would be quite different for each of the resulting three vests.

In addition, each patch may also include any suitable graphic material which further defines the patient's body position for each therapy step. As here shown, the graphic material is one or more arrows, as at shown 20 (FIG. 2), for example. The graphic material could also be the sketches of FIGS. 5-13, or other similar material.

FIG. 3 is a schematic map which numerically identifies the segments of the human broncho-pulmonary system, as follows:

TABLE 1

| Name of Segment | Number of Segment |
| --- | --- |
| RIGHT UPPER LOBE | |
| Apical | 1 |
| Anterior | 2 |
| Posterior | 3 |
| RIGHT MIDDLE LOBE | |
| Lateral | 4 |
| Medial | 5 |
| RIGHT LOWER LOBE | |
| Superior | 6 |
| Medial | 7 |
| Anterior Basal | 8 |
| Lateral Basal | 9 |
| Posterior Basal | 10 |
| LEFT UPPER LOBE | |
| Apical-Posterior | 1–3 |
| Anterior | 2 |
| Lingula | |
| Superior | 4 |
| Inferior | 5 |
| LEFT LOWER LOBE | |
| Superior | 6 |
| Anteromedial Basal | 7–8 |
| Lateral Basal | 9 |
| Posterior Basal | 10 |

If the location "9" (FIG. 3) is used by way of example, it is apparent that the patient's body should be more or less upside down if phlegm is to be drained, under gravity, into the bronchial tubes. On the other hand, location "1" drains downwardly into the bronchial tubes and the patient should be in an upright position.

The therapy requires the clapping, thumping, or vibrating of a patient by the open side of a cupped hand (FIG. 4), while the patient assists with deep breathing, coughing, or breathing in some particular way. Clapping may be done with the cupped hand striking the chest wall over the segment which is to be drained. The hand is preferably cupped by holding the fingers together so that the shape of the cupped hand conforms with the shape of the chest wall and tends to trap a cushion of air within the palm, which air softens the blow of the clapping. Of course, vibration may also be done with the flattened, not the cupped, hand. Either way, this clapping vibrates the patient's body to stimulate the movement of secretions and may help remove secretions sticking to the bronchial walls.

Clapping is usually performed on the patient by the therapist or another person who is trained in his particular needs. However, older patients may be taught to self-administer the clapping procedure, at least for treatment of some of the segments of their lungs.

Each of the FIGS. 5–13 have four parts. A number identifies a broncho-pulmonary segment, as numbered in FIGS. 3, and as set forth above on Table 1 and also identifies a patch on vest 10. An outline sketch of the lungs and a branch of the bronchial tube are darkened in areas which are to be treated or drained by the therapy step of the particular figure. A sketch of a child indicates the proper body position when the patient is clapped or vibrated at an area indicated by a heavily inked dot. Sometimes, an angle indicates the angle of a child's body (relative to a vertical or horizontal) during the treatment.

The following description is given in the terms of an infant who is wearing the inventive vest of FIGS. 1, 2. However, it should be understood that it could apply equally well to other children, or to adults.

Figure 5:
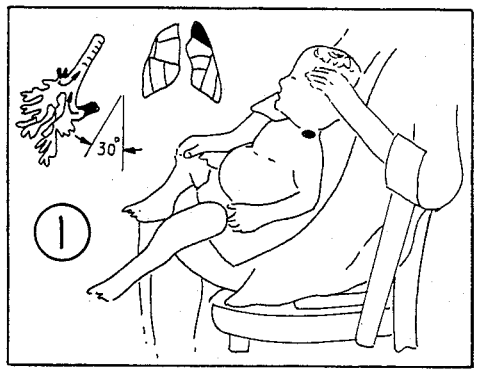

FIG. 5 shows the first therapy step for clearing upper lobes, apical segments: 1 (see Table 1). The infant is leaned back at a 30° angle (with respect to the vertical) while setting on the leaning against a pillow in the therapist's lap. The therapist claps over an area between the clavicle (collarbone) and top of the scapula (shoulder blade), at a position which is marked by a patch labeled "1" on vest 10. The area for the clapping of the apical-posterior segment of the left upper lobe L1, 3 is shown in FIG. 5 by a heavily inked dot. The apical segment of the right upper lobe, is drained by clapping in the same position, on the right side, as is indicated by the second of two patches marked "1" in FIG. 2.

It should be noted that the patient is sitting upright. Therefore, arrow 20 in the "1" patch (FIG. 2), points upwardly. The arrows (such as 20) in the various patches also represent any other suitable graphical form which may be used on the vest, such as the sketch which is seen in FIG. 5.

Figure 6:
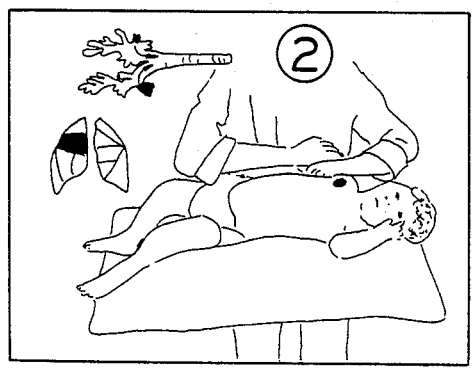

FIG. 6 shows a treatment for the upper lobes, anterior segments: 2. The infant is placed on his back over a pillow on a therapist's lap. The therapist claps between the clavicle (collarbone) and the nipple on each side of chest, i.e. over patches "2" on the vest 10. The arrows in patches 2 point horizontally to indicate that the infant is lying horizontally.

Figure 7:
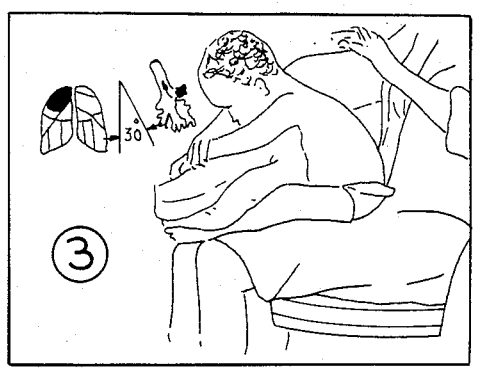

FIG. 7 indicates the treatment for the upper lobes, posterior segments: 3. The infant sits on a pillow and is leaned forward over the therapist's lap, at a 30° angle with respect to vertical. Then, the therapist claps over the upper back on each side of the chest at the two patches "3" on vest 10. The area for clapping, marked by a heavily inked dot, shown in FIG. 7, is for the apical-posterior segment of the left upper lobe. The arrows in patches 3 point upwardly to indicate the upright position.

Figure 8:
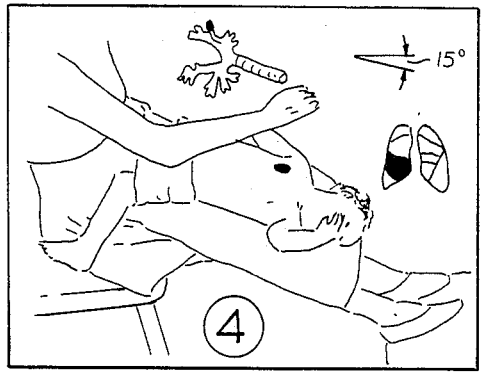

As shown in FIG. 8, to treat the middle right lobe, lateral segment 4, the infant is placed over a pillow on the extended legs of the therapist. The infant lies on his left side, head down at 15° with respect to the horizontal, and is rotated ¼ turn toward his back. The therapist claps over the right nipple, at the patch "4" on vest 10. The three arrows in patch 4 point downwardly and horizontally, and show the rolled over position.

Figure 9:
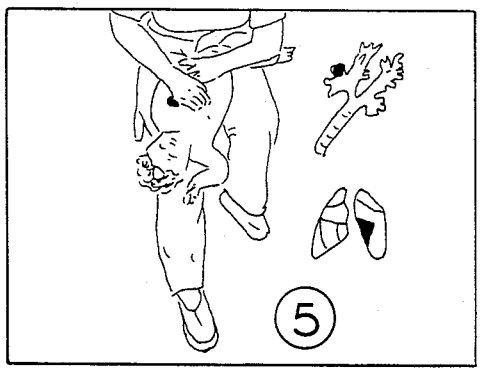

In FIG. 9, the treatment is for the lingular segment, left upper lobe: L4, 5. The lingular segment of the left upper lobe, is drained by placing the infant in the head-down position on the extended legs of the therapist, except that the infant is placed on his right side and is then rotated ¼ turn toward his back. Then, the therapist claps over the left nipple at patch "5" on vest 10. The two arrows on patch 5 show the head down, rolled over position.

Figure 10:
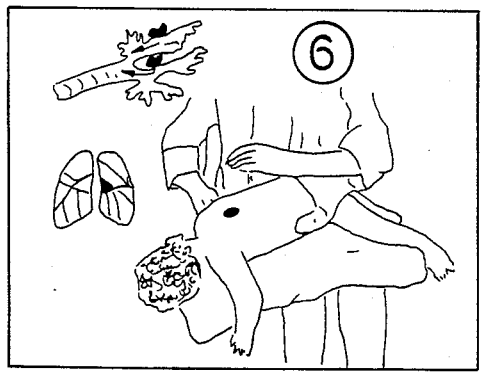

FIG. 10 illustrates the treatment for the lower lobes, superior segments: 6. The infant is placed flat on his abdomen over a pillow in the therapist's lap. The therapist then claps at the heavily inked dot over the middle of the back below the tip of the scapula (shoulder blade), at patches "6" on either side of the spine. The arrows on patches "6" show the horizontal body positions.

Figure 11:
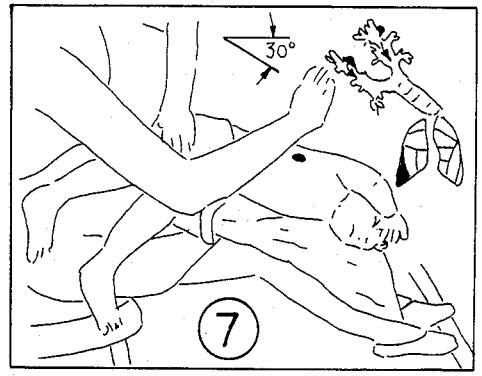

FIG. 11 shows the treatment for lower lobes anterior basal segments: 8. The infant is placed on a pillow over the extended legs of the therapist. The infant lies on his left side in a head-down position for drainage of the right anterior basal segment. He lies on his right side in the same head-down position to drain the left anterior basal segment. The therapist claps over the lower ribs just beneath the axilla (armpits) at the two patches marked "7" in FIG. 1. The two arrows in patches "7" indicate the head-down, body rolled over positions.

Figure 12:
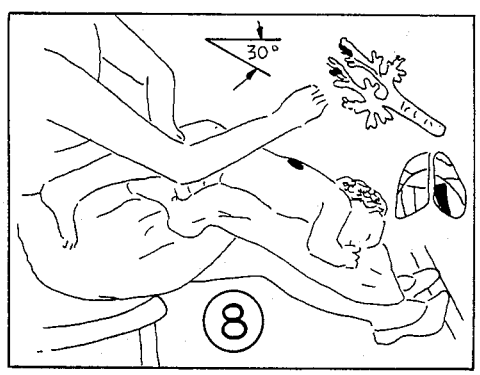

FIG. 12 refers to the treatment of the lower lobes, lateral basal segment: 9. The infant is placed over a pillow on the extended legs of the therapist in a head-down position and rotated from the prone position ¼ turn toward the front. The therapist claps over the uppermost portion of the lower ribs, as indicated at the patches "8". To drain the left lateral basal segment, L9, the infant should be rotated toward his right side from the same head-down position and the therapist should clap over the left side of the chest. The head-down, rolled over positions are shown by the two arrows on patches "8".

Figure 13:
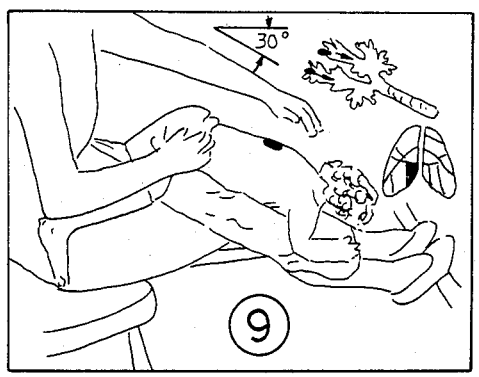

FIG. 13 shows the treatment for the lower lobes in the posterior basal segments: 10. The infant is placed flat on his abdomen over a pillow on the extended legs of the therapist. The infant lies in a head-down position while the therapist claps over the lower ribs, close to the spine on each side of the chest. The area for clapping is identified in FIG. 2 by the two patches "9". The arrows on patches "9" show the head-down position of the child.

The foregoing description has illustrated a few exemplary treatment steps which may have been prescribed for a particular patient. The body positions are herein described as being for an infant. Another patient may require different positions and different areas to be clapped. Children or adults may rest on various pillows, inclined boards, tipping or reclining chairs or beds or the like. The clapping, thumping, or vibration could be also accomplished by a machine or vibrator. Thus, there are many alternative showings which could be substituted for the showings in FIGS. 5–13. Those who are familiar with cystic fibrosis are also familiar with alternative treatments.

Further, different therapy aids may be placed on the vest. For example, stick figures, cartoons, sketches or written instructions could be substituted for the arrows.

Means may be formed on the vest, for enabling a therapist to enlist the patient's cooperation in assuming a correct body position. For example, pictures may be placed on the vest to attract the attention of and promote cooperation by small children. For the body position of FIG. 7, for example, the child could be told to lean over in one direction and look first at a blue bird printed on the vest, and then to lean over in another direction and look at a red bird printed on the vest so that first the left patch "3" and then the right patch "3" can be clapped.

The following publications recognize and discuss various aspects of segmental bronchial drainage: Pulmonary Rehabilitation Manual, Rehabilitation Institute of Chicago, Northwestern-McGaw Medical Center, March, 1973; Nursing '83, May volume; Patient's Care in Respiratory Problems, Jane Secor, W. B. Saunders Co., 1969; and Brady's Programmed Introduction to Respiratory Therapy, Robert J. Brady Co., 1971.

Those who are skilled in the art will readily perceive how to modify the invention. Therefore, the appended claims are to be construed to cover all equivalent structures which fall within the true scope and spirit of the invention.

The claimed invention is:

1. A therapy aid for treating cystic fibrosis comprising a vest having thereon located externally on the vest in the area above the thoracic cavity, a plurality of sequentially numbered positions for identifying places on a patient's body which are to be successively clapped in the numbered sequence, and padding means in said vest located under each of said numbered positions to provide a sufficient amount of padding at each of said places where said body is clapped, whereby when the patient is clapped to break loose the debris of the lungs without significant injury to the tissue being clapped.

2. The therapy aid of claim 1 and means for fastening said vest around the body of a patient, said fastening means having substantially no bulk to hurt said body if clapping should occur over said fastener.

3. The therapy aid of claim 1 and means associated with each of said numbered positions for identifying a body posture to be assumed when that place is clapped.

4. The therapy aid of claim 1 wherein said vest is made of quilted material having patches attached thereto in order to provide added padding at a specific place where clapping is to occur.

5. The therapy aid of claim 1 wherein said numbered positions are prescribed for a particular individual according to his uniquely disease caused problems.

6. The therapy aid of claim 1 wherein said vest is made of quilted material having patches attached thereto at each of said numbered positions in order to provide added padding at a specific place where clapping is to occur, means for fastening said vest around the body of a patient, said fastening means having substantially no bulk to hurt said body if clapping should occur over said fastener, and means associated with each of said numbered positions for identifying a body posture to be assumed when that place is clapped.

7. A cystic fibrosis vest made of quilted material having batting positioned between two layers of cloth, said vest being located externally in the area above the thoracic cavity, said batting providing a sufficient amount of padding which is appropriate to treat a cystic fibrosis patient, a plurality of patches sewn over said vest at preselected locations for adding incremental amounts of padding to said general padding, means for individually identifying each of said patches to establish a sequence for clapping the body of a patient, means associated with each of said patches for indicating a posture for the body while it is clapped at the location of the patch, and means for fastening the vest around the body of the patient, whereby when the patient is clapped to break loose the debris of the lungs without significant injury to the tissue being clapped.

8. The vest of claim 7 and graphic means on said vest for enabling a therapist to tell a patient how to position his body to facilitate therapy.

9. The therapy aid of claim 7 and means for fastening said vest around the body of a patient, said fastening means having substantially no bulk to hurt said body if clapping should occur over said fastener.

10. The therapy aid of claim 7 wherein said numbered positions are prescribed for a particular individual according to his uniquely disease caused problem.

* * * * *